Dec. 12, 1933.  H. B. DUCKWORTH  1,939,207
COUPLING
Filed May 13, 1931

Inventor
Hyrum B. Duckworth
By Allen Davis Atty.

Patented Dec. 12, 1933

1,939,207

UNITED STATES PATENT OFFICE 1,939,207

COUPLING

Hyrum B. Duckworth, Garfield, Utah

Application May 13, 1931. Serial No. 537,015

5 Claims. (Cl. 64—96)

This invention relates to rotary couplings for transmission of power, particularly the heavy duty class of coupling.

The chief object of the invention is to provide an improved coupling capable of operating efficiently under conditions of either parallel or angular misalignment and of affording substantial torsional flexibility.

It is also an object of the invention to provide a coupling of simple and inexpensive construction and in which the parts subject to wear may be removed and replaced with a minimum of effort and expense.

Other objects and advantages of the invention will appear in the description of the particular construction selected for illustration.

Figure 1:
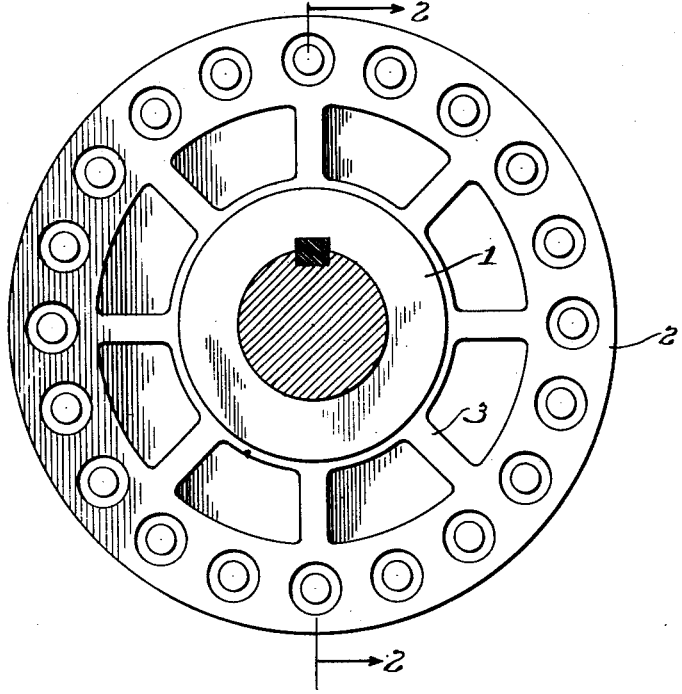
Figure 1 is a view in end elevation of the improved coupling.
Figure 2:
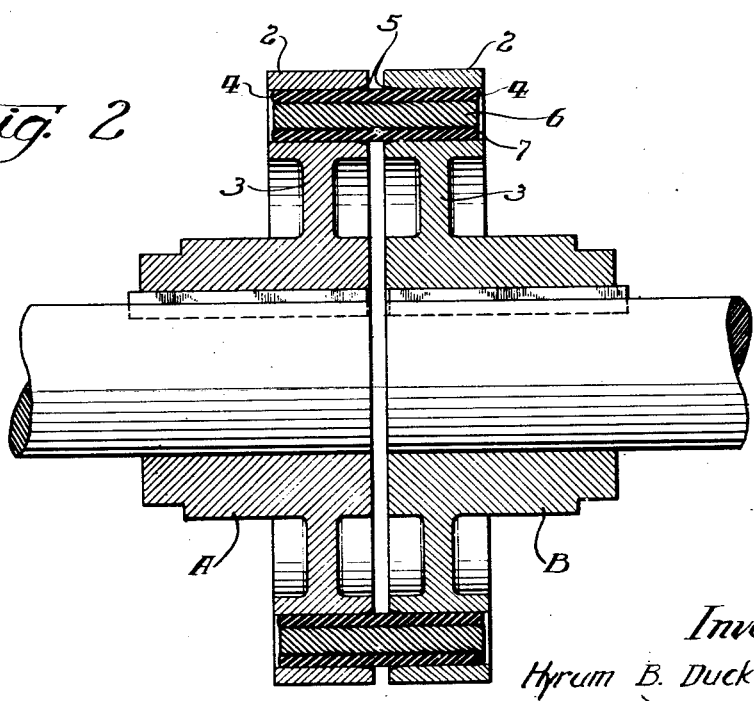
Figure 2 is a sectional view taken along line 2—2 of Figure 1.

In the form shown, the body of the coupling consists of two parts A and B, preferably of identical construction, and each comprising a hub 1, rim 2, and connecting spokes 3. It will be understood, of course, that the hub and rim of members A and B may be connected by a solid plate or disc instead of the spokes as shown. The members A and B of the coupling may be keyed to shafts as shown, or otherwise secured to rotary power transmission elements of any other character. The rims 2 are of suitable width and substantial thickness, as shown, and each is provided with a circular series of apertures or bores 4 arranged with their axes parallel to the axes of members A and B. Attention is directed to the fact that on adjacent faces of members A and B the bores 4 are slightly belled out as by rounding the edges as indicated at 5 in Figure 2.

The driving connection between members A and B is of such character as to provide substantially universal flexibility. This connection comprises a plurality of flexible driving pins, each consisting of a length of steel wire rope 6 and a corresponding length of flexible tubing 7 formed of rubber or a combination of rubber and fabric. Standard varieties of tubing or hose, for example air hose, may be used for this purpose. The ends of the lengths of steel wire rope may be welded to prevent undue separation of the strands, if desired. The diameter of the wire rope is preferably such that it snugly fits the bore of the tubing, while the latter has snug fit in the bores 4 of members A and B. Experience indicates that it is best to have the wire rope cores driven or pressed into the flexible sleeves. Caps may be provided on the ends of tubes 7 to completely enclose the steel rope, if desired, or the outer ends of bores 4 may be provided with closures, but such features are not esential and are not herein shown.

It will be noted, of course, that members A and B are spaced axially. This is necessary in order to permit slight end play in either direction and the movements incident to angular misalignment and also to provide torsional flexibility and the flexibility required by parallel misalignment. While this space should be kept as small as possible, consistent with good results, the exact amount of spacing is not a critical factor.

The theory of action of this coupling should be largely apparent to those familiar with the requisites of good coupling performance. The sections of steel wire rope are, of course, flexible, but they are also very strong and durable. These sections of wire rope provide the necessary load carrying strength and at the same time permit the required degree of flexing or relative movement between the coupling members. It will be noted, however, that there is not a single metal to metal contact between relatively movable parts. The sections of wire rope are maintained out of contact with the coupling members by the flexible tubular sleeves, thus avoiding the wear incident to metal to metal contact. Under all conditions of flexing, whether torsional or lateral, the inevitable relative movement occurs, not between the flexible driving pins and the body members of the coupling, but between the component parts of the several driving pins. All flexing action results in either elongation or contraction of the central portions of the tubular sleeves and is usually accompanied by a slight sliding action between the wire rope sections and their respective sleeves. During slight lateral movements of the members A and B the entire wire rope core will have a certain amount of lateral movement, whereas the outer surface of the flexible sleeve will tend to cling to the holes in members A and B, as a certain amount of stretch or elongation will develop in the rubber sleeve, thereby permitting limited lateral movement of the coupling halves without the flexible sleeves sliding in the holes or the wire rope cores sliding in the sleeves.

Slight axial variations between the coupling members is readily permitted due to the fact that there is not a rigid connection between them. Such variations will result merely in slight compression of the intermediate portions of the flexible sleeves.

The purpose of the belled portions 5 of the bores 4 is, of course, to facilitate flexing of the tubular sleeves and to prevent undue abrasion or cutting of the said sleeves as a result of such flexing.

The sections of wire rope may be of standard stock of twisted or woven steel wire rope. With some classes of rope it may be necessary to weld the ends of the sections in order to prevent separation of the strands.

It should be understood that the essential features of the invention may be embodied in couplings differing in design from that herein shown. It should also be appreciated that some latitude is permitted in the selection of the component parts of the flexible driving pins, within the scope of this invention.

I claim:

1. A flexible coupling comprising a pair of members normally in axial alignment and axially spaced, a circular series of flexible driving pins connecting said members, each said driving pin comprising a flexible metallic element surrounded by an elastic non-metallic, transversely compressible element contacting said members.

2. A flexible coupling comprising a pair of members normally in axial alignment and slightly spaced axially, a circular series of flexible driving pins connecting said members, each said driving pin comprising a section of steel wire rope surrounded by an elastic non-metallic, transversely compressible sleeve arranged to contact said members to connect the said rope thereto.

3. A flexible coupling comprising a pair of members normally in axial alignment and slightly spaced axially, a circular series of flexible driving pins connecting said members, each said driving pin comprising a flexible metallic section surrounded by a rubber sleeve contacting said members.

4. A flexible coupling comprising a pair of members, a plurality of flexible driving pins connecting said members, each said driving pin comprising a section of steel wire rope with a covering sleeve of rubber and fabric which connects the said rope to said members.

5. A flexible coupling comprising two members to be connected and having aligned apertures, a flexible metallic core, and an elastic non-metallic, transversely compressible sleeve tightly fitting the core and received in said aligned apertures.

HYRUM B. DUCKWORTH.